United States Patent Office.

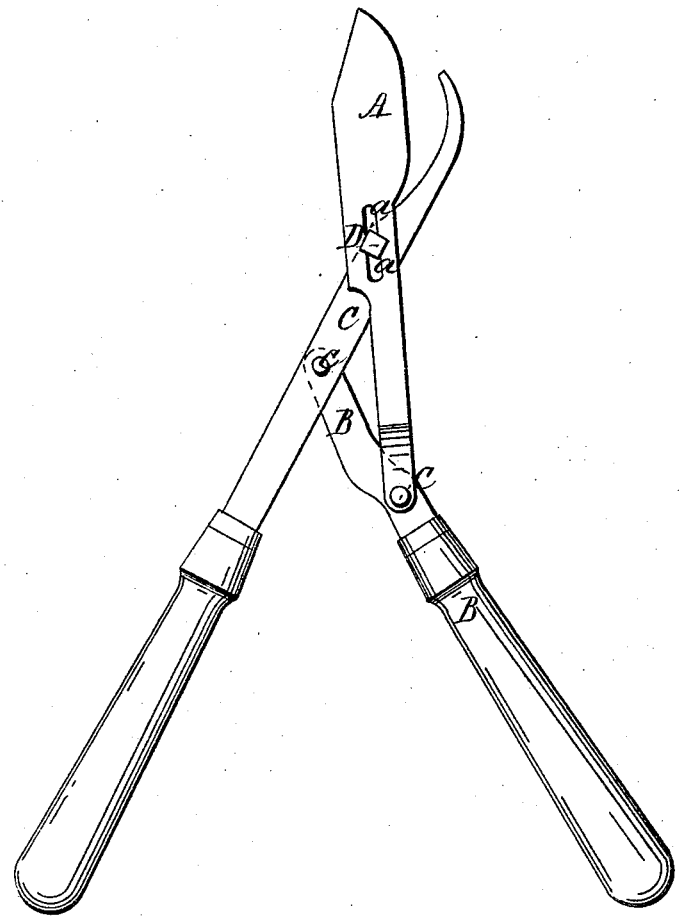

PETER KECK, OF ZANESVILLE, OHIO.

Letters Patent No. 64,882, dated May 21, 1867.

PRUNING-SHEARS.

*The Schedule referred to in these Letters Patent and making part of the same.*

TO ALL WHOM IT MAY CONCERN:

Be it known that I, PETER KECK, of Zanesville, Muskingum county, Ohio, have invented a new and improved Pruning-Shears; and I do hereby declare that the following is a full, clear, and exact description thereof, which will enable others skilled in the art to make and use the same, reference being had to the accompanying drawing, forming a part of this specification.

The nature of this invention consists of three levers to form a pruning-shears, whereof the cutting-blade has a convex edge, the levers being so attached as to produce a drawing cut, and has for its objects increased facility in the use of the pruning-shears, and the production of a clean cut. In the accompanying drawing—

A is the cutting-blade of my improved shears, secured to the handle B by the bolt $b$, on which it turns as a pivot, and bearing a slot, $a$. The handle B is secured to the blade C by the bolt $c$, on which it turns as a pivot. The bolt D passes through the slot O in the cutting-blade A, and is firmly set in the blade C. The cutting part of the blade A has a convex edge, and the mode of attachment of the levers A, B, and C, producing a drawing or sliding motion when the handles are opened and closed, passes the cutting-blade through the limb or substance to be operated upon with an easy motion and a clear cut.

I claim as new, and desire to secure by Letters Patent—

1. The mode of attachment of the blades of a pair of shears composed of three levers, substantially as shown and described.

2. The combination of a convex-edged cutting-blade with the mode of attachment of the blades of a pair of shears composed of three levers, substantially as shown and described.

The above specification of my invention signed by me this 25th day of February, 1867.

PETER KECK.

Witnesses:
    J. W. McCORMICK,
    J. B. WOODS.